(12) United States Patent
Stewart

(10) Patent No.: US 7,900,943 B2
(45) Date of Patent: Mar. 8, 2011

(54) CONSTANT VELOCITY JOINT REAR WHEEL SUSPENSION SYSTEM FOR ALL-TERRAIN VEHICLE

(76) Inventor: Craig Stewart, Sanlee, CA (US)

( * ) Notice: Subject to any disclaimer, the term of this patent is extended or adjusted under 35 U.S.C. 154(b) by 191 days.

(21) Appl. No.: 11/940,740

(22) Filed: Nov. 15, 2007

(65) Prior Publication Data

US 2009/0127813 A1    May 21, 2009

(51) Int. Cl.
*B60G 21/055* (2006.01)
*B60G 9/02* (2006.01)
*B60G 3/22* (2006.01)

(52) U.S. Cl. ...... 280/124.128; 280/124.156; 280/124.11; 280/124.116; 180/350; 180/357; 180/378; 180/217

(58) Field of Classification Search ........... 280/124.156, 280/124.152, 124.1, 124.11, 124.117, 124.118, 280/124.119, 124.128, 124.116; 180/350, 180/357, 358, 378, 217, 348, 349, 352
See application file for complete search history.

(56) References Cited

U.S. PATENT DOCUMENTS

| 4,469,188 A | * | 9/1984 | Mita | 180/215 |
| 4,877,102 A | * | 10/1989 | Stewart | 180/217 |
| 5,845,918 A | * | 12/1998 | Grinde et al. | 280/124.1 |

* cited by examiner

*Primary Examiner* — Ruth Ilan
*Assistant Examiner* — Keith Frisby
(74) *Attorney, Agent, or Firm* — John R. Ross; John R. Ross, III

(57) ABSTRACT

A rear suspension system for an all-terrain vehicle having a chassis and at least three wheels. Two trailing arms are pivotally connected to a chassis. Each of the trailing arms includes a drive shaft bearing. A CV joint pivot arm is pivotally connected to the chassis. A CV joint housing is connected to the CV joint pivot arm. The CV joint housing includes a CV joint bearing. A CV joint is housed inside the CV joint housing and is supported by the CV joint bearing. A drive shaft extends through the CV joint and is rigidly connected to the CV joint. The drive shaft is further supported by each of the drive shaft bearings attached to the trailing arms. A shock absorption system is connected between the drive shaft and the chassis. In a preferred embodiment, a cross bar is connected between the trailing arms for stability. Also, preferably, the rear suspension system includes a sway bar and linear shock absorbers acting in combination to provide optimum suspension.

8 Claims, 11 Drawing Sheets

US 7,900,943 B2

CONSTANT VELOCITY JOINT REAR WHEEL SUSPENSION SYSTEM FOR ALL-TERRAIN VEHICLE

The present invention relates to all-terrain vehicles, and, in particular, to rear suspension systems for all-terrain vehicles.

BACKGROUND OF THE INVENTION

CV Joints

Constant Velocity (CV) joints are known in the prior art. CV joints are commonly attached to automobile axles and they allow the axle to move in all directions, including longitudinal, back-and-forth and up-and-down. The CV joint allows a rotating axle to transmit power through a variable angle, at constant rotational speed, without an appreciable increase in friction or play. The CV joint functions to keep the drive wheels of a vehicle on the ground, while allowing the drive wheels to travel up and down with the suspension.

FIG. 1 shows prior art CV joint 5. CV joint 5 includes splined inner race 61. Splines 4 rigidly connect CV joint 5 to a splined drive shaft so that there is no slippage. Steel balls 62 ride in grooves in inner race 61 and outer race 63. Balls 62 are nested inside holes in circular cage 64.

FIGS. 2-5 illustrate a common prior art usage of a CV joint 5 for a front-wheel drive vehicle. Protective boots 81 are also shown and they function to protect the CV joint by keeping the grease inside the CV joint and by keeping dirt and moisture out of the CV joint. FIGS. 2 and 3 show how CV joints 5 permit steering and FIGS. 4-5 illustrate how CV joints 5 permit the up-and-down motions of suspension.

Sway Bar Assembly

Sway bar assemblies are known. A sway bar assembly (also known as stabilizer bar, a sway bar, anti-sway bar, roll bar, or anti-roll bar, ARB) is an automobile suspension device. It connects opposite (left/right) wheels together through short lever arms (also known as sway bar arms) linked by a torsion bar. The springing motion of a torsion bar is provided by the metal bar's resistance to twisting. The torsion bar that connects the opposite wheels together is also sometimes referred to as a "sway bar". A sway bar assembly increases the suspension's roll stiffness—its resistance to roll in turns, independent of its spring rate in the vertical direction.

All-Terrain Vehicles

All-Terrain Vehicles (ATVs) are known in the prior art. An ATV is a vehicle that travels on tires with a seat that is straddled by an operator and that has handlebars for steering control. The rider sits on and operates an ATV like a motorcycle, but the extra wheels give more stability at slow speeds. Although typically equipped with three or four wheels, six-wheel models exist for specialized applications. Engine sizes of ATVs currently for sale in the United States (as of 2008 products) range from 49 cc to 1000 cc and 49 cc to 700 cc for two stroke ATVs.

Four wheeled versions are also commonly called "four-wheelers", "quads", "quad bikes" or "quad cycles". Models with three wheels are typically known as "three-wheelers," and ATCs (or less commonly "All-Terrain Cycles" and "trikes").

FIG. 6 shows a simplified side view and FIG. 7 shows a simplified rear view of prior art ATV 90. ATV 90 utilizes a swingarm suspension system that includes swingarm 92 and linear shock absorber 91. Swingarm 92 is pivotally connected to chassis 94 and to axle 93. Linear shock absorber 91 is pivotally connected to chassis 94 and to swingarm 92.

In FIGS. 8 and 9 rear tire 95 has hit a bump. Swingarm 92 has pivoted and linear shock absorber 91 has contracted to provide suspension. However, due to the speed of the ATV and the height of the bump, rear wheel 96 has lost contact with the ground. Because wheel 96 is no longer in contact with the ground, it is now more difficult to control ATV 90. The operator of ATV 90 is now in danger of losing control, losing speed or even tipping over and crashing.

What is needed is a better rear suspension system for an ATV.

SUMMARY OF THE INVENTION

The present invention provides a rear suspension system for an all-terrain vehicle having a chassis and at least three wheels. Two trailing arms are pivotally connected to a chassis. A CV joint pivot arm is pivotally connected to the chassis. A CV joint housing is connected to the CV joint pivot arm. The CV joint housing includes a CV joint bearing. A CV joint is housed inside the CV joint housing and is supported by the CV joint bearing. A drive shaft riding on a drive shaft bearing extends through the CV joint and is rigidly connected to the CV joint. A shock absorption system is connected between the drive shaft and the chassis. In a preferred embodiment, a cross bar is connected between the trailing arms for stability. Also, preferably, the rear suspension system includes a sway bar assembly and linear shock absorbers acting in combination to provide optimum suspension.

DETAILED DESCRIPTION OF A THE PREFERRED EMBODIMENTS

Figure 14:
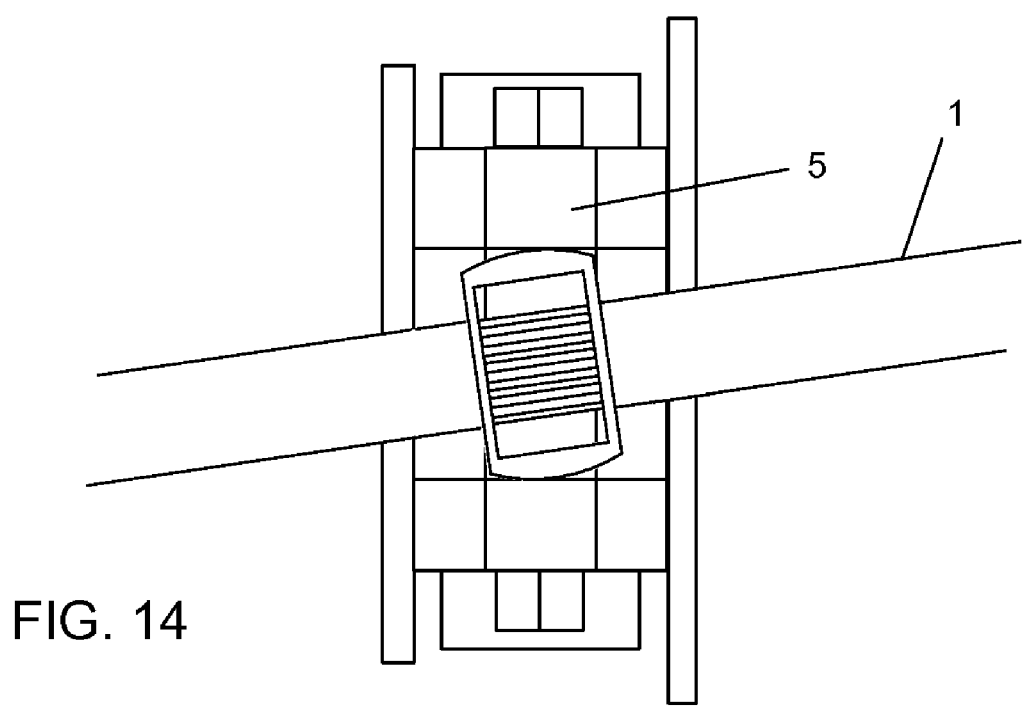
Figure 15:
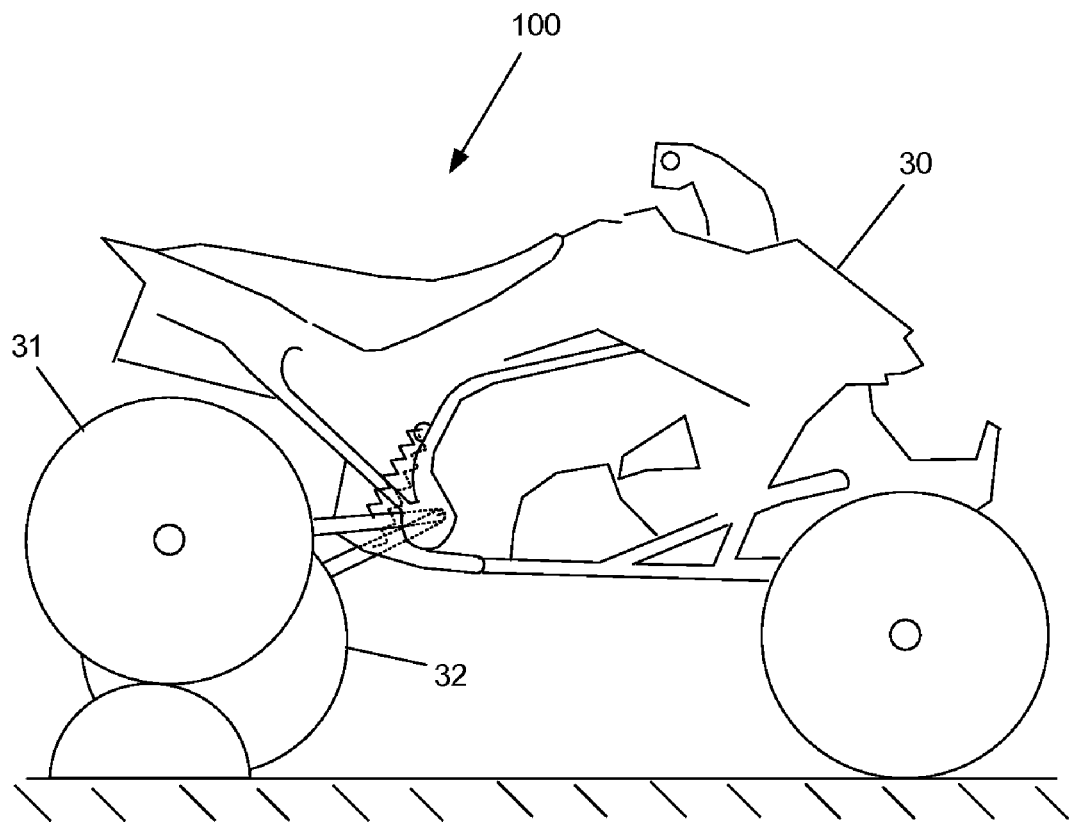
FIGS. 15-16 show a preferred embodiment of the present invention.
Figure 16:
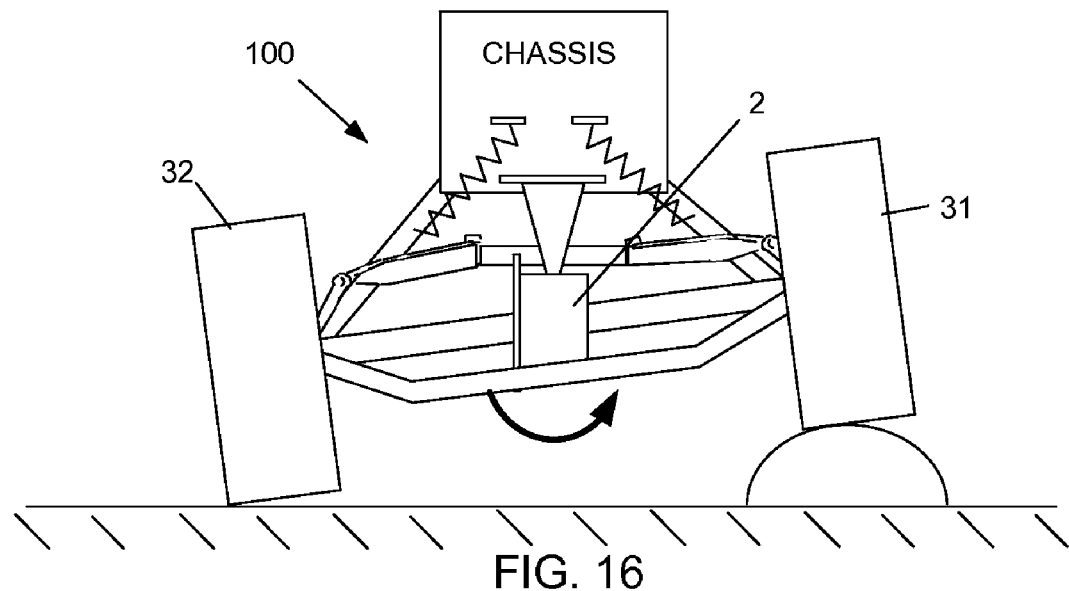

FIGS. 10, 11, and 13-16 show a preferred embodiment of the present invention. ATV 100 utilizes CV joint 5 (FIGS. 13 and 14) located within CV joint housing 2 to provide optimum rear suspension. CV joint 5 allows for the movement of drive shaft 1 in any direction while ATV 100 is in operation. Therefore, as shown in FIGS. 15 and 16, when ATV 100 hits a bump at high speed, both wheels 31 and 32 will remain in contact with the ground in order to provide optimum control at high speed and safety to the operator.

CV Joint

Drive shaft 1 extends through CV joint housing 2. To prevent slipping, preferably shaft 1 includes splines 3 (FIG. 13) that mesh with splines 4 of CV joint 5. Sprocket drive flange 6 is bolt connected to CV joint 5. Rotor drive flange 7 is also bolt connected to CV joint 5. Likewise, sprocket 8 is bolt connected to sprocket drive flange 6 and brake rotor 9 is bolted to rotor drive flange 7. CV joint 5 is supported by CV joint bearings 41 and 42.

Chain Drive

In a preferred embodiment of the present invention, shaft 1 is chain driven. Engine 10 (FIG. 11) turns gear 11. Gear 11 is connected to sprocket 8 via chain 12. The turning of gear 11 causes sprocket 8 to spin. This, in turn, causes CV joint 5 to spin. The spinning of CV joint 5 causes shaft 1 to spin.

Drive Shaft

Drive shaft 1 (FIG. 10) is connected to trailing arms 25 and 26 and rides on drive shaft bearings 203 and 204 housed inside bearing housings 20 and 18, respectively. Drive shaft 1 is driven by chain 12, as explained above.

Trailing Arms

Trailing arms 25 and 26 are pivotally connected to the chassis and are also pivotally connected to shaft 1. As part of the rear suspension, trailing arms 25 and 26 allow for shaft 1 and the tires to move relative to the chassis.

CV Joint Pivot Arm

Figure 1:
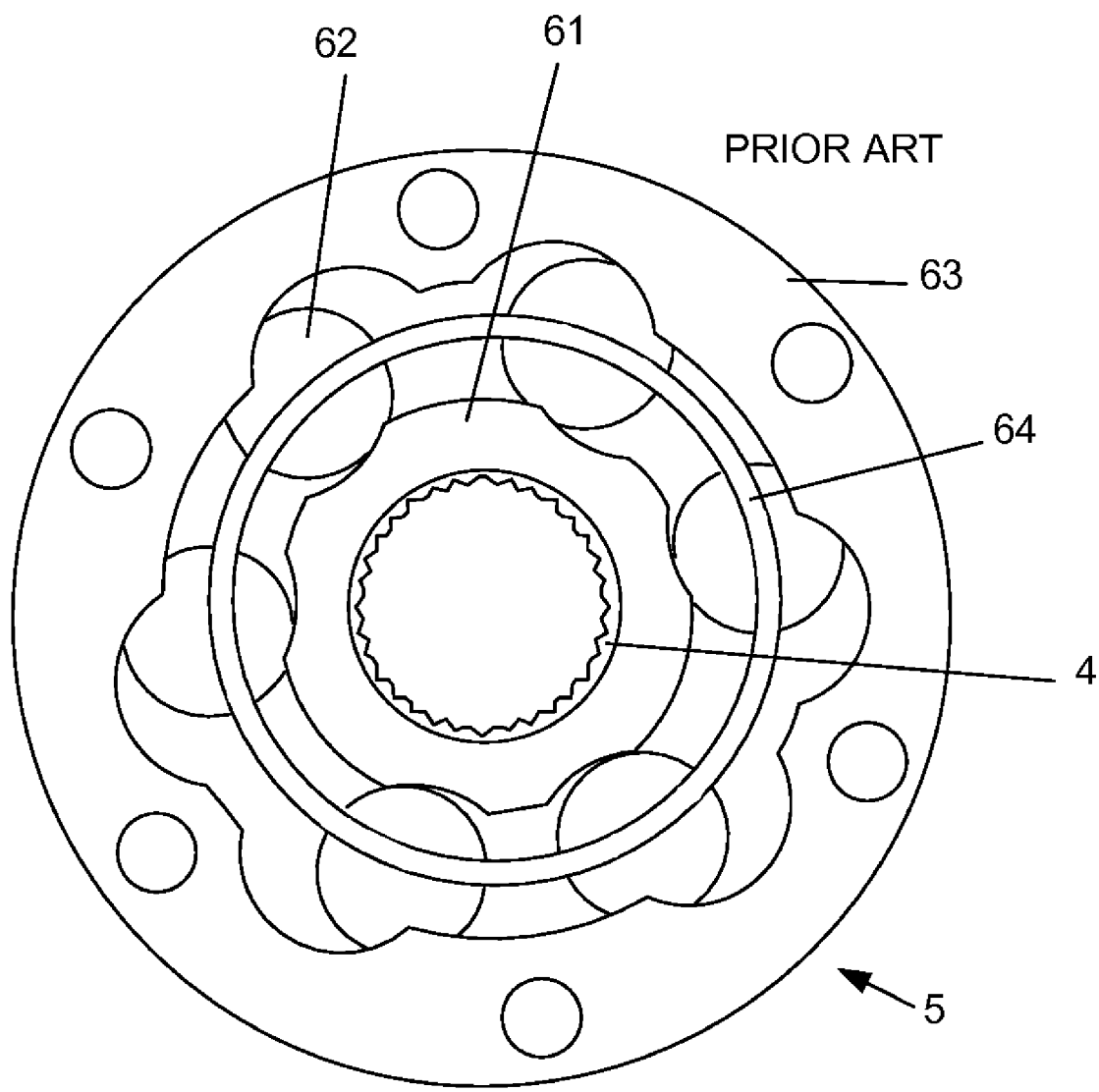
FIG. 1 shows a prior art CV joint.
Figure 2:
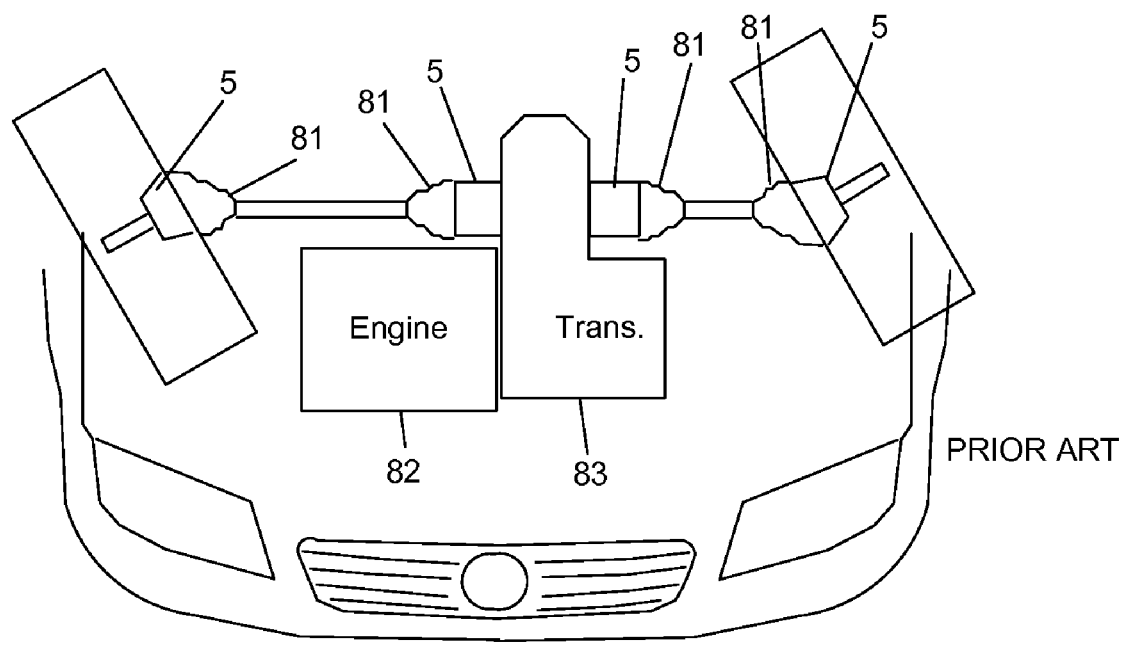
FIGS. 2-5 show a prior art usage of CV joints.
Figure 3:
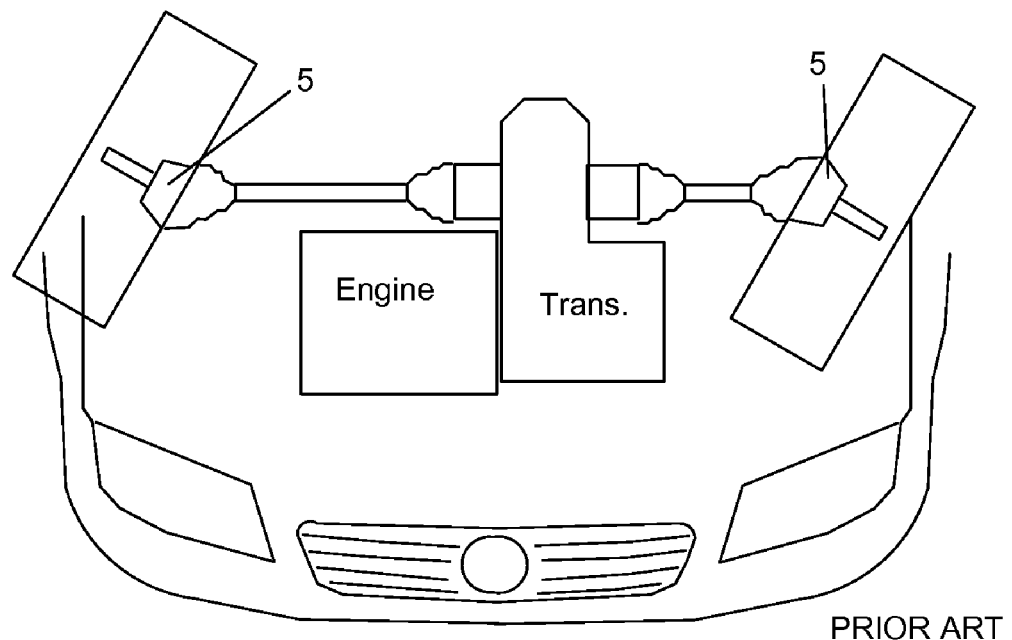
Figure 4:
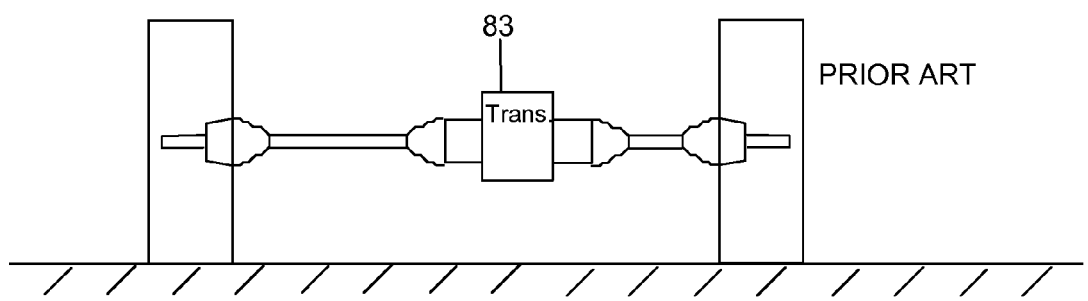
Figure 5:
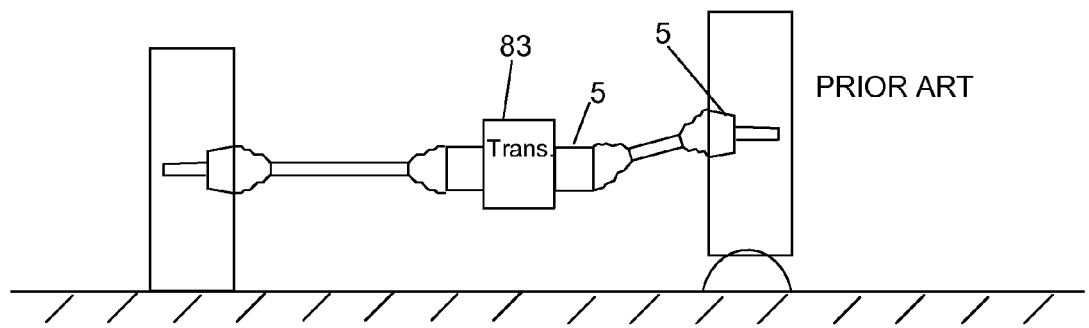
Figure 6:
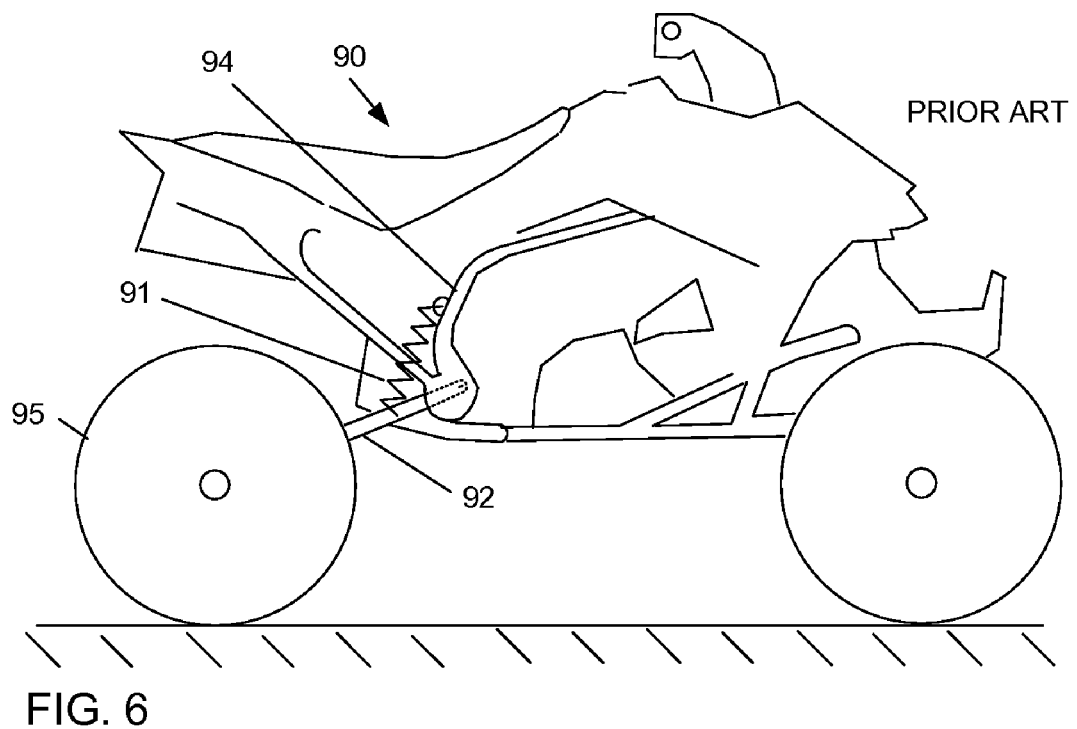
FIGS. 6-9 show a prior art ATV rear suspension system.
Figure 7:
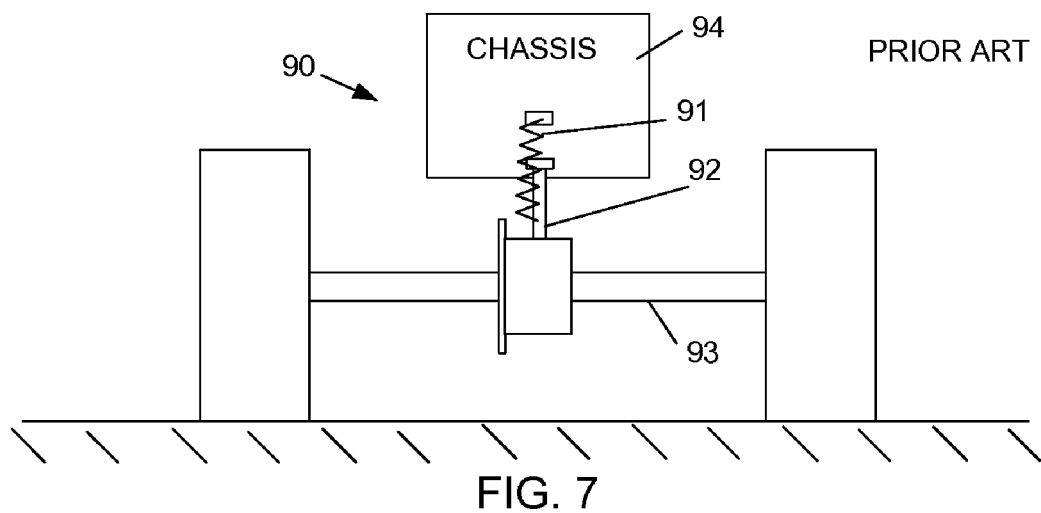
Figure 8:
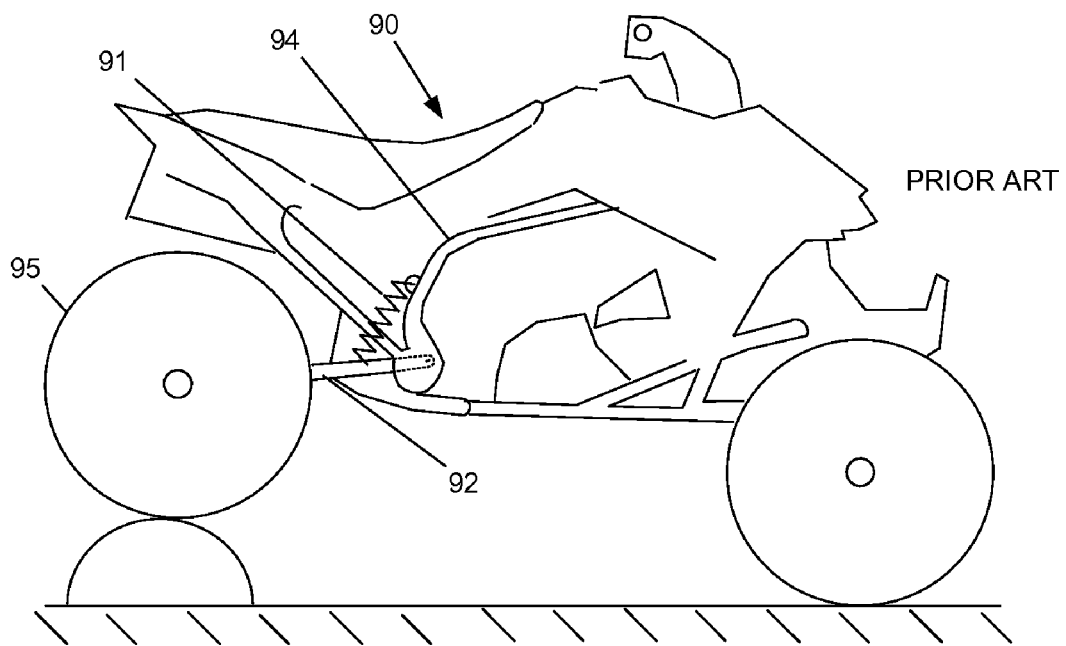
Figure 9:
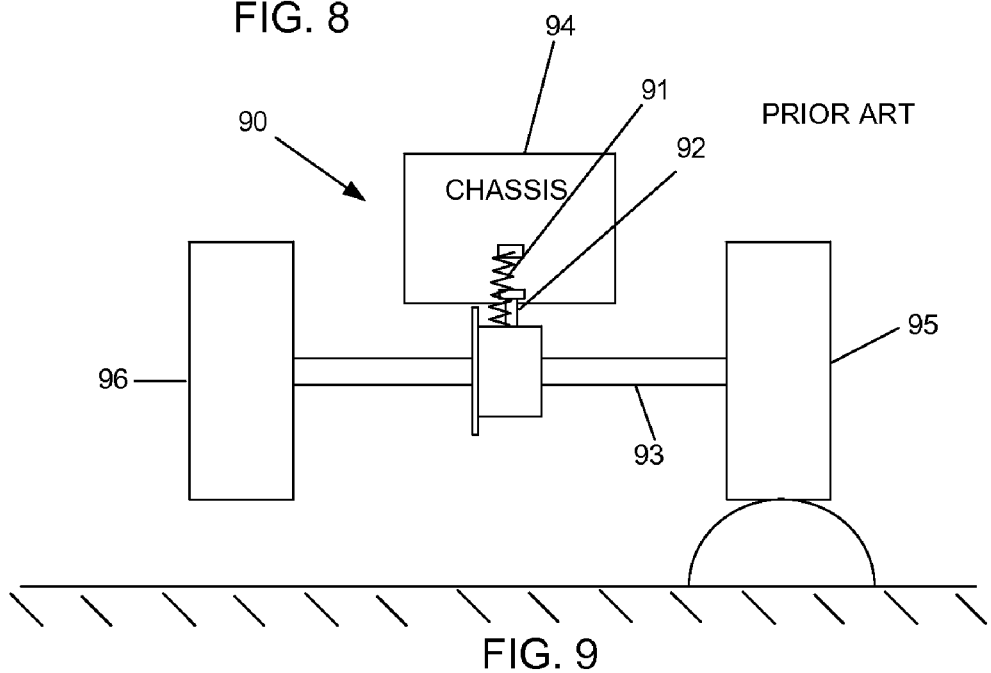
Figure 10:
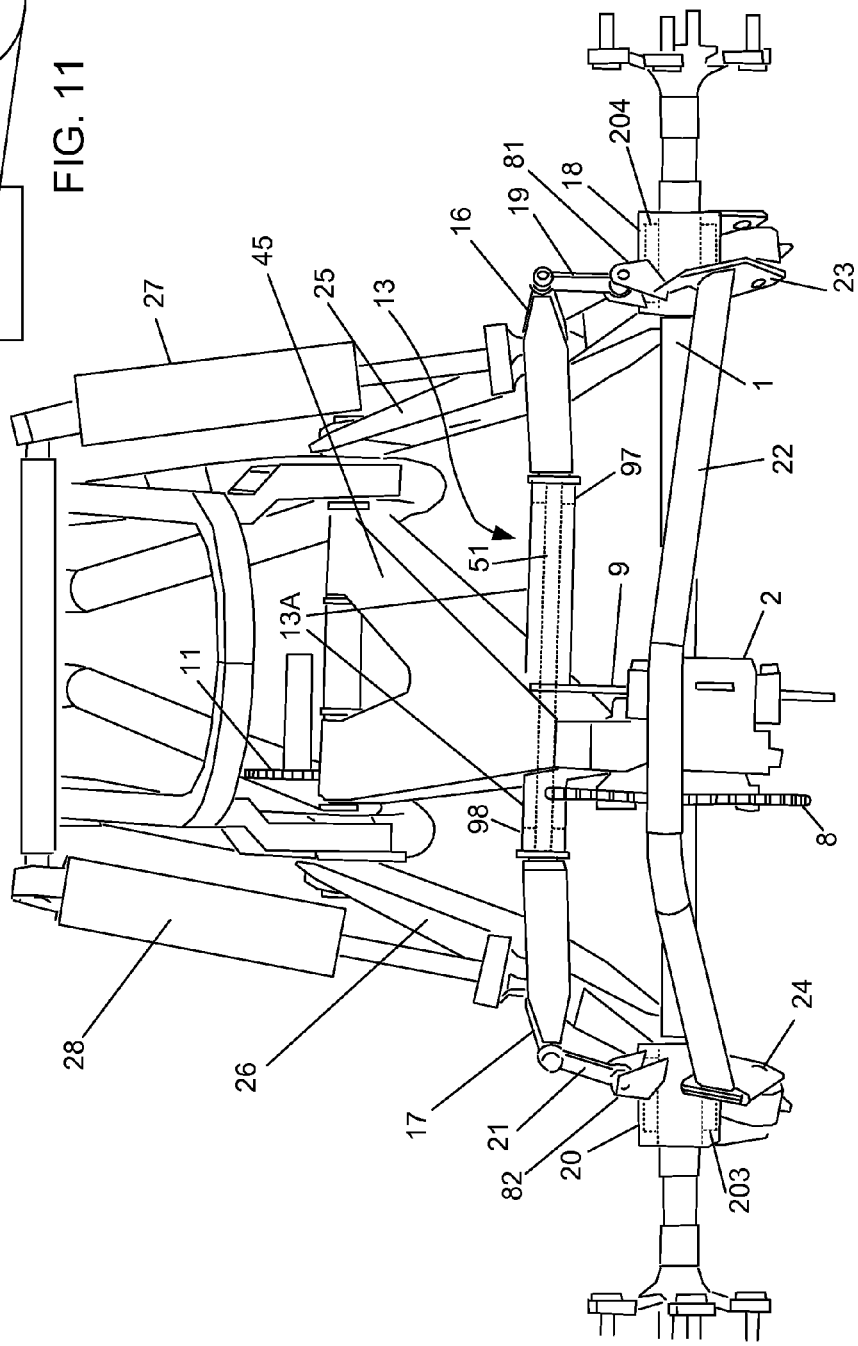
FIGS. 10 and 11 show a preferred embodiment of the present invention.
Figure 11:
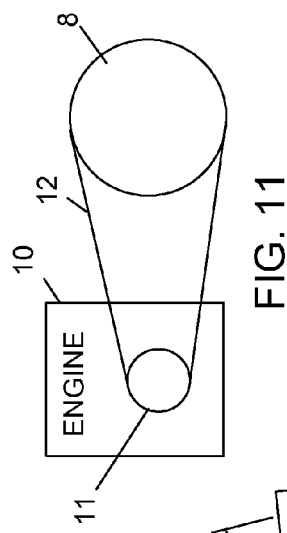

CV joint pivot arm 45 is pivotally connected to the chassis as shown in FIG. 10. Sway bar housing 13A is rigidly connected to CV joint pivot arm 45 and CV joint housing 2 is also rigidly connected to CV joint pivot arm 45. As part of the rear suspension, CV joint pivot arm 45 allows for motion of shaft 1 and the tires relative to the chassis.

Sway Bar Assembly

A preferred embodiment of the present invention includes sway bar assembly 13. Sway bar assembly 13 includes sway bar housing 13A with torsion bar 51, respectively. Torsion bar 51 is supported by bearings 97 and 98. Sway bar housing 13A is rigidly connected to CV joint pivot arm 45. Sway bar arm 16 and sway bar arm 17 are both connected to torsion bar 51. The motion of sway bar arms 16 and 17 is resisted by the twisting of torsion bar 51. Sway bar arm 16 is pivotally connected to flange 81 via link 19 and sway bar arm 17 is pivotally connected to flange 82 via link 21. Flanges 81 and 82 are rigidly connected to bearing housing 18 and 20, respectively. Bearing housing 18 and 20 are both rigidly connected to trailing arms 25 and 26, respectively. Sway bar assembly 13 functions to keep drive shaft 1 horizontal during the operation of the vehicle by reducing body lean.

Cross Bar

A preferred embodiment of the present invention includes cross bar 22 (FIG. 10) rigidly connected to flanges 23 and 24. Flanges 23 and 24 are rigidly connected to bearing housing 18 and 20, respectively. Cross bar 22 functions to increase the stability of the rear wheel section and to prevent twisting, buckling or collapse of shaft 1.

Linear Shock Absorbers

Linear shock absorbers 27 and 28 are pivotally connected to the chassis and to trailing arms 25 and 26 (FIG. 10) and provide for shock absorption while the vehicle is in operation.

Example of Operation of Preferred Embodiment

Figure 12:
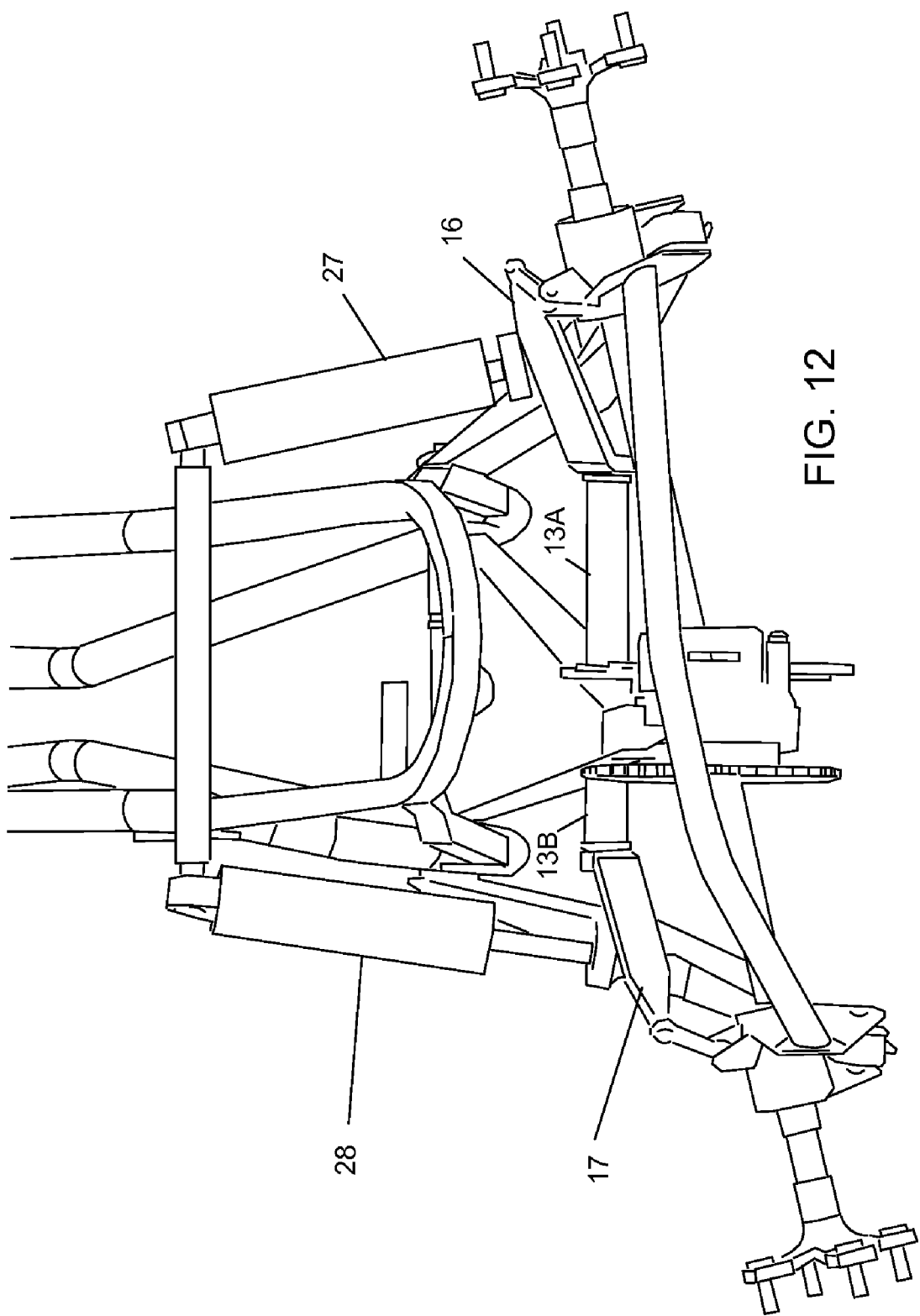
FIG. 12-14 show the drive shaft moving relative to the CV joint housing.
Figure 13:
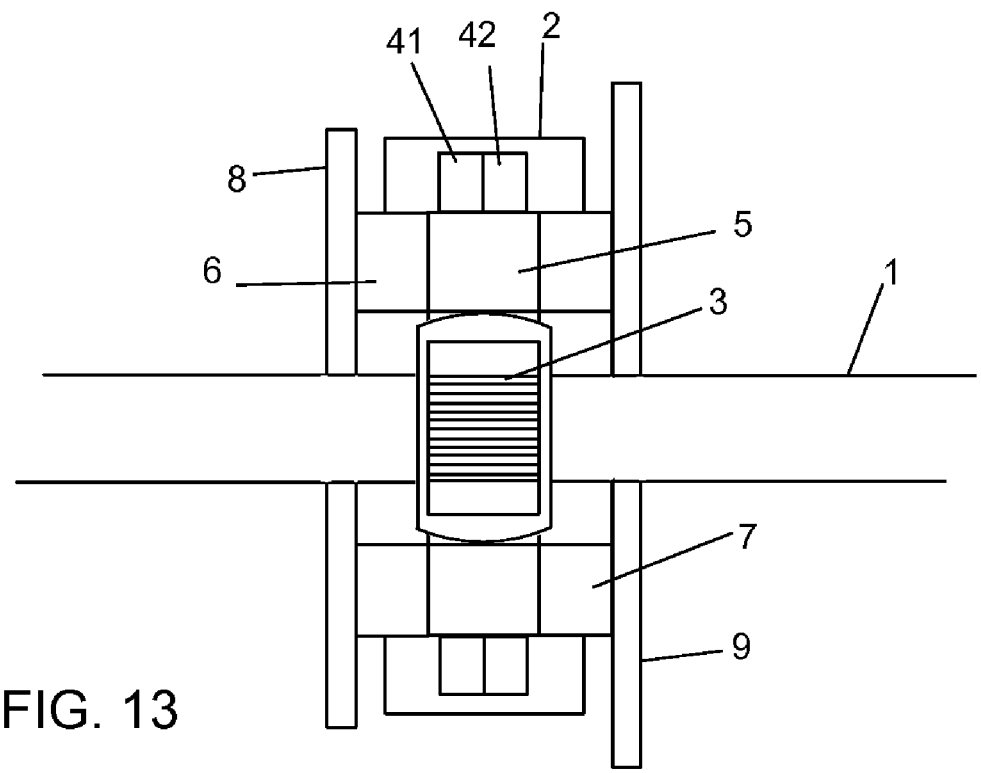

An example of the operation of a preferred embodiment of the present invention can be seen by reference to FIGS. 10-16. As shown in FIGS. 15 and 16, rear tire 31 of vehicle 30 has just hit a bump. In response to the bump, tire 31 has moved upward. This has caused shaft 1 to rotate counterclockwise with respect to CV joint 5 (FIG. 14). As shown in FIG. 12, in order to absorb the shock generated by the bump, linear shock absorbers 27 and 28 have contracted and sway bar arms 16 and 17 have rotated about the axis formed by sway bar housing 13A (FIG. 12). After clearing the bump linear shock absorbers 27 and 28 and sway bar arms 16 and 17 will return shaft 1 to the position shown in FIG. 10.

By the utilization of CV joint 5, both tires 31 and 32 have remained in contact with the ground while providing rear suspension to the operator. This has allowed for a safer, faster and more comfortable ride.

Other Preferred Embodiment

Figure 18:
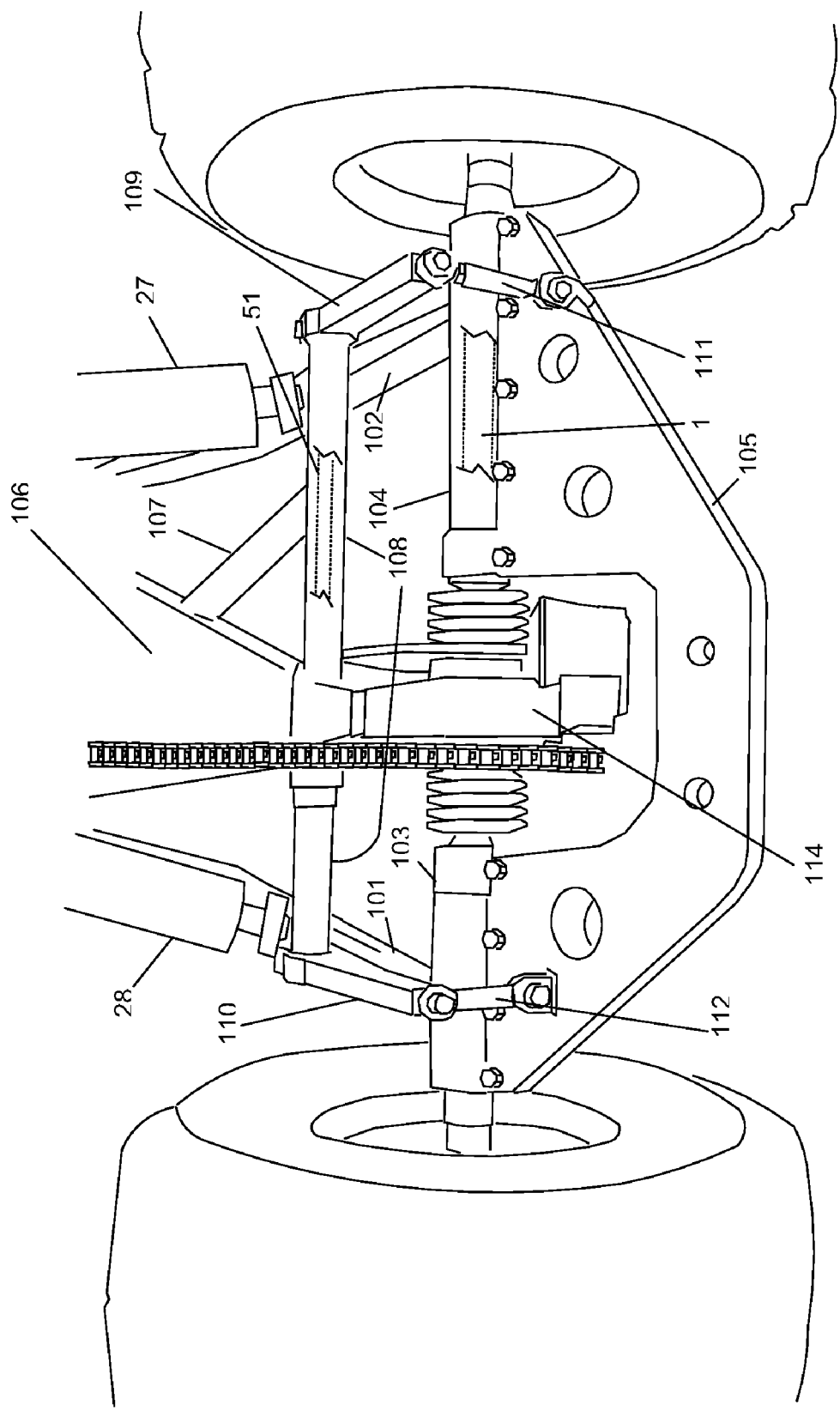
FIG. 18 shows another preferred embodiment of the present invention.

Another preferred embodiment of the present invention is shown in FIG. 18. In FIG. 18 linear shock absorbers 27 and 28 are pivotally connected between said chassis and trailing arms 102 and 101, respectively. Trailing arms 101 and 102 are pivotally connected to the chassis and rigidly connected to bearing housings 103 and 104, respectively. Drive shaft 1 extends through bearing housings 103 and 104 and rides on bearings (not shown). Sway bar housing 108 is rigidly connected to CV joint pivot arm 106. CV joint pivot arm 106 is pivotally connected to the chassis. CV joint housing 114 is rigidly attached to the end of CV joint pivot arm 106. Drive shaft 1 is spline connected to CV joint 2 (not shown) inside CV joint housing 114 in a fashion similar to that described above in reference to the earlier preferred embodiment. Sway bar arms 109 and 110 are pivotally attached to torsion bar 51. Sway bar arms 110 and 109 are pivotally connected to cross bar 105 via links 112 and 111, respectively. In this preferred embodiment, cross bar 105 is larger, has greater surface area and extends further along the length of shaft 1. This increases the strength of cross bar 1 and further increases the stability of the rear wheel section and to prevent twisting, buckling or collapse of drive shaft 1. Also, by connecting links 112 and 111 directly to the cross bar there is less stress on the bearing housings 103 and 104.

Figure 17:
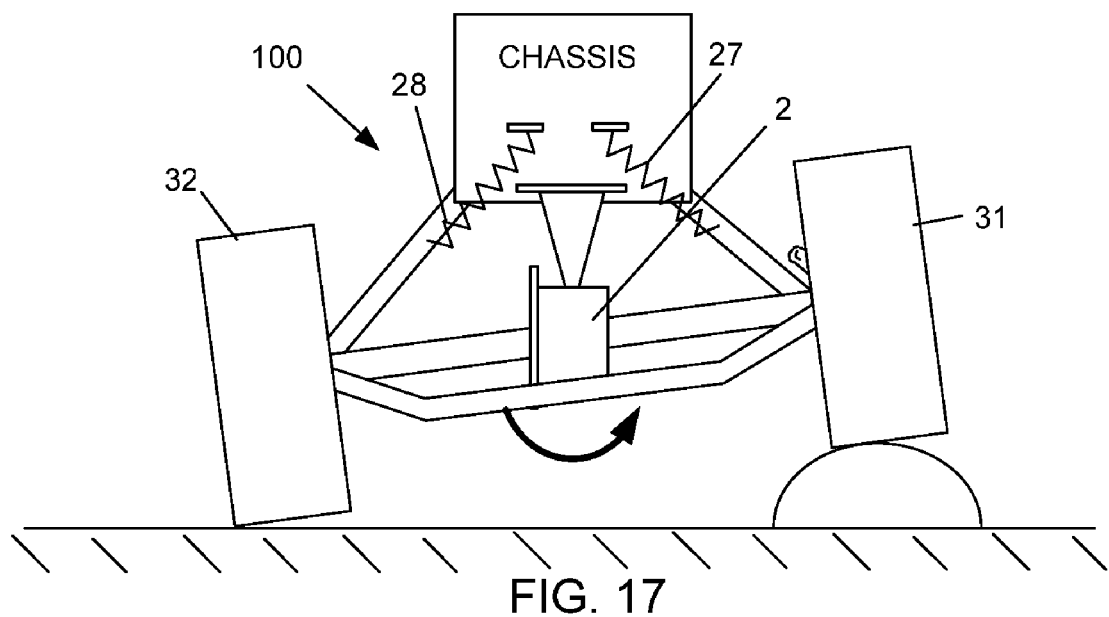
FIG. 17 shows another preferred embodiment of the present invention.

Although the above-preferred embodiments have been described with specificity, persons skilled in this art will recognize that many changes to the specific embodiments disclosed above could be made without departing from the spirit of the invention. For example, in the preferred embodiment described above it was shown that the present invention utilizes a shock absorber system that includes a combination of two linear shock absorbers working in conjunction with a sway bar to provide shock absorption for the rear suspension. It is possible, in other preferred embodiments, to modify the shock absorber system. For example, FIG. 17 shows a simplified rear view of a preferred rear suspension system similar to that shown in FIG. 16. However, in FIG. 17, sway bar has been removed and linear shock absorbers 27 and 28 have been tightened to provide the shock absorption for the rear suspension. Therefore, the attached claims and their legal equivalents should determine the scope of the invention.

What is claimed is:

1. A rear suspension system for an all-terrain vehicle having a chassis and at least 3 wheels, comprising:
   A) two trailing arms pivotally connected to said chassis,
   B) a Constant Velocity (CV) joint pivot arm pivotally connected to said chassis,
   C) a CV joint housing connected to said CV joint pivot arm, said CV joint housing comprising a CV joint bearing,
   D) a CV joint housed inside said CV joint housing and supported by said CV joint bearing,
   E) a drive shaft riding on a drive shaft bearing and extending through said CV joint and rigidly connected to said CV joint,
   F) a shock absorber system connected between said drive shaft and said chassis, and
   G) a sway bar assembly connected between said CV joint pivot arm and each of said two trailing arms.

2. The rear suspension system as in claim 1, wherein said sway bar assembly comprises at least 1 torsion bar for absorbing shock.

3. The rear suspension system as in claim 1, further comprising a cross bar rigidly connected between said two trailing arms, said cross bar for providing stability to said two trailing arms.

4. The rear suspension system as in claim 1, wherein said drive shaft is chain driven.

5. The rear suspension system as in claim 1 wherein said sway bar assembly is pivotally connected to said two trailing arms.

6. The rear suspension system as in claim 1 further comprising a sprocket rigidly connected to said CV joint.

7. The rear suspension system as in claim 1, wherein said shock absorber system comprises:
   A) two linear shock absorbers, each of said two linear shock absorbers pivotally connected to said chassis and pivotally connected to said two trailing arms, and
   B) a sway bar assembly, comprising:
      A) a sway bar housing rigidly connected to said CV joint pivot arm,
      B) a torsion bar inserted through said sway bar housing, and
      C) two sway bar arms, each of said two sway bar arms pivotally connected to one of said two trailing arms at a sway bar arm first end and connected to said torsion bar at a sway bar arm second end.

8. The rear suspension system as in claim 1, wherein said shock absorber system comprises two linear shock absorbers, each of said two linear shock absorbers pivotally connected to said chassis and pivotally connected to said two trailing arms.

* * * * *